(12) United States Patent
Erhart et al.

(10) Patent No.: US 8,867,730 B2
(45) Date of Patent: Oct. 21, 2014

(54) CONTACT CENTER TREND ANALYSIS AND PROCESS ALTERING SYSTEM AND METHOD

(75) Inventors: George Erhart, Loveland, CO (US); Valentine C. Matula, Granville, OH (US); David Skiba, Golden, CO (US)

(73) Assignee: Avaya, Inc., Basking Ridge, NJ (US)

(*) Notice: Subject to any disclaimer, the term of this patent is extended or adjusted under 35 U.S.C. 154(b) by 562 days.

(21) Appl. No.: 12/862,079

(22) Filed: Aug. 24, 2010

(65) Prior Publication Data
US 2012/0051526 A1    Mar. 1, 2012

(51) Int. Cl.
*H04M 3/00* (2006.01)
*H04M 3/523* (2006.01)

(52) U.S. Cl.
CPC ........ *H04M 3/5232* (2013.01); *H04M 2201/18* (2013.01); *H04M 2203/551* (2013.01)
USPC .................................................. 379/265.09

(58) Field of Classification Search
CPC ... H04M 3/5175; H04M 3/51; H04M 3/5191; H04M 3/5166; H04M 3/493; H04M 3/5183; H04M 3/5237; H04M 2201/40; H04M 2203/2011; G06Q 50/01; G06Q 30/01; G06Q 30/016; G06Q 30/0251; G06Q 50/16; H04L 29/08189; H04L 67/32
USPC ................. 705/1, 1.1, 319, 9, 35; 379/202.01
See application file for complete search history.

(56) References Cited

U.S. PATENT DOCUMENTS

| | | | |
|---|---|---|---|
| 7,565,338 B2* | 7/2009 | Beniaminy et al. | 706/47 |
| 8,296,278 B2* | 10/2012 | Abraham | 707/705 |
| 2003/0004802 A1* | 1/2003 | Callegari | 705/14 |
| 2007/0016689 A1* | 1/2007 | Birch | 709/241 |
| 2008/0040427 A1* | 2/2008 | Shroff et al. | 709/204 |
| 2010/0121672 A1 | 5/2010 | Kohler et al. | |

* cited by examiner

*Primary Examiner* — Mohammad Islam

(57) ABSTRACT

A trend is identified by examining multiple communications in a contact center. For example, a trend can be a specific issue or problem related to a product. A communication related to the trend is identified. Based on identification of the trend, a process for routing the communications in the contact center is altered.

In one embodiment, different menus/items in an Interactive Voice Response (IVR) system are changed based on the identified trend. In other embodiments, communications related to the trend are identified and moved to different queues or held in queues until there is a valid response. The identified communications can be responded to automatically, by specific agents, by group mailings, and the like. In addition, prior communications that relate to the trend are identified. This allows additional responses to be sent or processes to be altered in order to provide the customer with a better quality of service.

16 Claims, 5 Drawing Sheets

CONTACT CENTER TREND ANALYSIS AND PROCESS ALTERING SYSTEM AND METHOD

TECHNICAL FIELD

The system and method relates to contact centers and in particular to identifying trends in contact centers.

BACKGROUND

Contact centers have dealt with trends in various ways. For example, an agent in the contact center may notice an increase in the number of calls related to a particular product, a new problem with a product, and the like. The agent can inform other agents and/or supervisors about the issue and how to deal with the issue. Scripts/responses for the agents of the contact center can be generated based on the issue. This way the agents in the contact center can more easily deal with the problem when customers call in with questions about the issue.

The problem with existing solutions is that by the time a trend is identified, the contact center may be overwhelmed and unable to handle a large number of customers calling about the issue. This results in decreased customer satisfaction and loss of business. What is needed is a more elegant way of identifying trends and automated ways to more efficiently handle customers when there is an issue that may require the contact center to handle a large number of communications dealing with the issue.

SUMMARY

The system and method are directed to solving these and other problems and disadvantages of the prior art. A trend is identified by examining multiple communications in a contact center. For example, a trend can be a specific issue or problem related to a product that is increasing or decreasing. A communication related to the trend is identified. Based on identification of the trend, a process for routing the communications in the contact center is altered.

In one embodiment, different menus/items in an Interactive Voice Response (IVR) system are changed based on the identified trend. In other embodiments, communications related to the trend are identified and moved to different queues or held in queues until there is a valid response. The identified communications can be responded to automatically, by specific agents, by group mailings, and the like. In addition, prior communications that relate to the trend are identified. This allows additional responses to be sent or processes to be altered in order to provide the customer with a better quality of service.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Some embodiments will be illustrated below in conjunction with one or more exemplary communication systems. Although well suited for use with, e.g., a system using switch(es), server(s) and/or database(s), communications endpoints, etc., the embodiments are not limited to use with any particular type of contact center or configuration of system elements. Those skilled in the art will recognize that the disclosed techniques may be used in any contact center application in which it is desirable to provide enhanced features.

Figure 1:
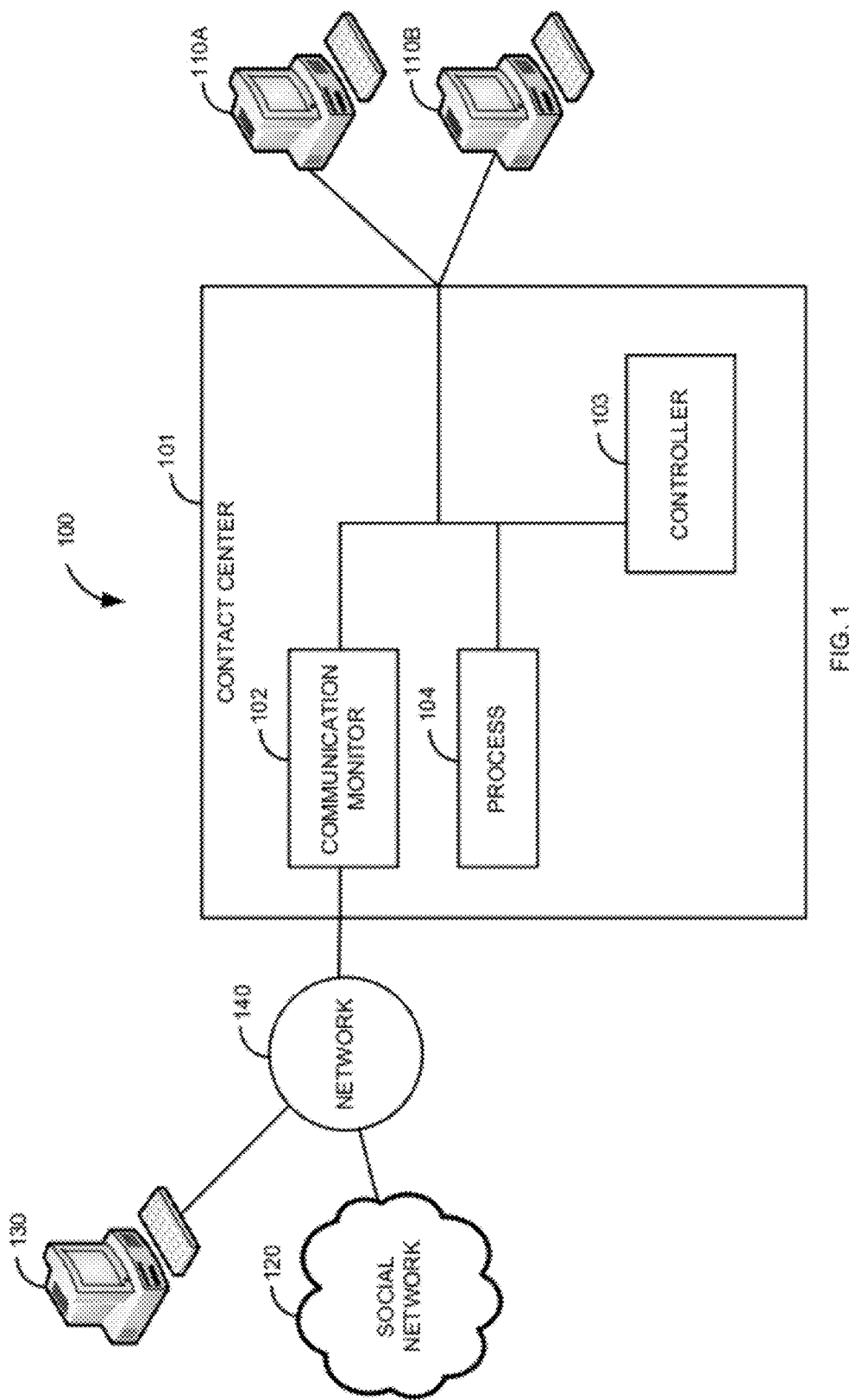
FIG. 1 is a block diagram of a first illustrative system for identifying a trend and altering a process in a contact center.

FIG. 1 is a block diagram of a first illustrative system 100 for identifying a trend and altering a process 104 in a contact center 101. First illustrative system 100 comprises a contact center 101, a communication device 130, a social network 120, a network 140, and agent terminals 110A-110B. Communication device 130 can be any type of device that can communicate, such as a personal computer, a telephone, a Personal Digital Assistant (PDA), a cellular telephone, a server, a web server, an email server, a radio, and the like. Social network 120 can be any type of social network where users can interact, such as Facebook®, Twitter®, a blog site, and the like. Network 140 can be any type of network that allows communications, such as a Local Area Network (LAN), a Wide Area Network (WAN), the Internet, a cellular network, the Public Switched Telephone Network, a combination of these, and the like. Agent terminals 110A-110B can be any device that allows a contact center agent to process communications, such as a telephone, a personal computer, a cellular telephone, a terminal, a display, a keypad, and the like.

Contact center 101 can be any type of contact center that can monitor any type of communications. For example, contact center 101 can monitor a variety of communications, such as voice communications, video communications, text communications, emails, Instant Messages (IM), communications on a social network 120, and the like. Contact center 101 is shown as a single system. However, contact center 101 can be distributed between a variety of devices, such as servers, databases, Private Branch Exchanges (PBXs), switches, routers, and the like.

Contact center 101 further comprises a communication monitor 102, a controller 103, and a process(es) 104. Communication monitor 102 can be any software/hardware that can monitor one or more types of communications. Communication monitor 102 can monitor communications from a variety of sources and in a variety of ways, such as on social network 120, to and from communication device 130, to and from a telephone, an email, an Instant Message (IM), communications between communication devices 130, and the like. Controller 103 can be any hardware/software that can monitor/alter process(es) 104 in contact center 101.

Figure 2:
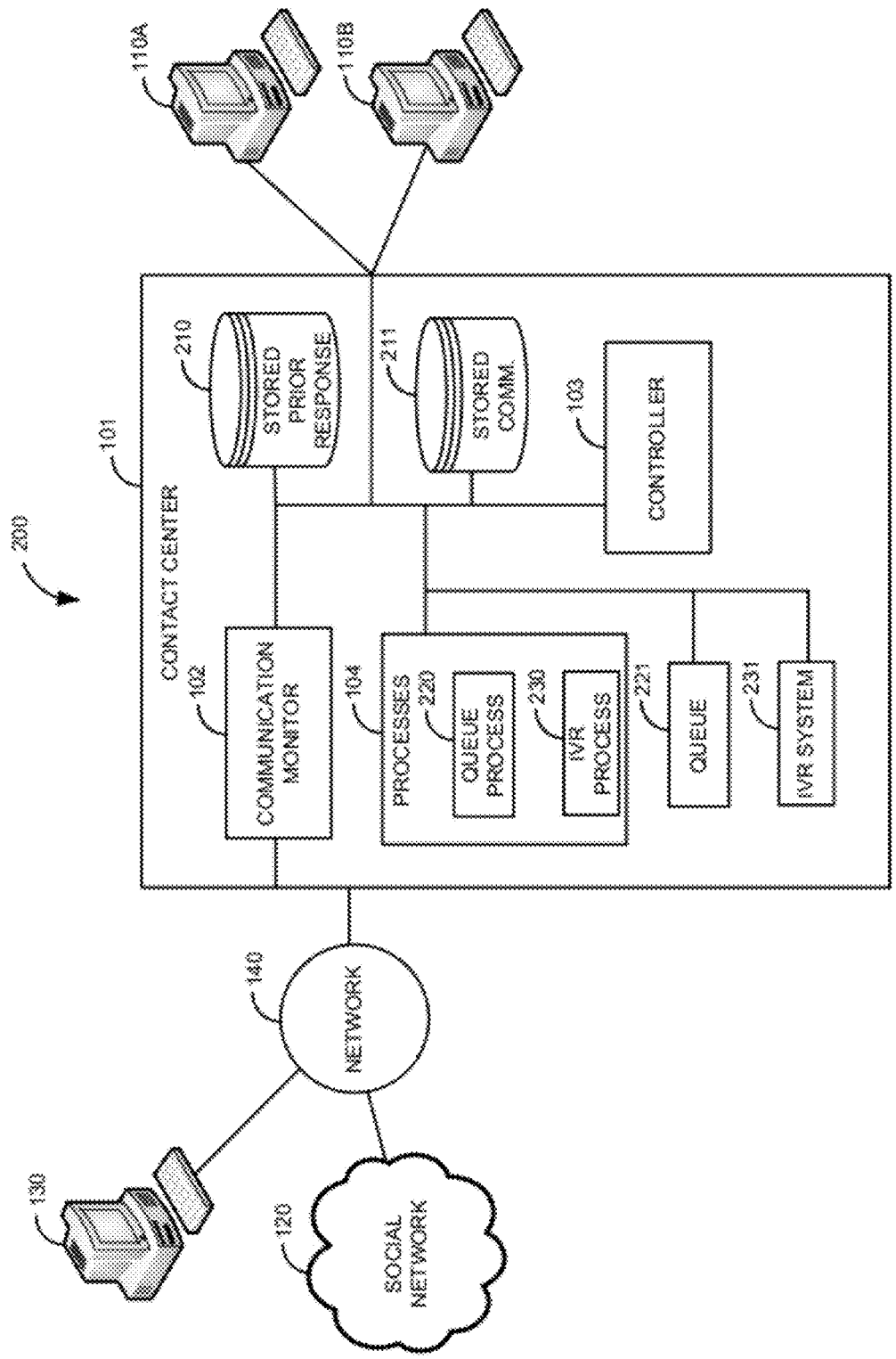
FIG. 2 is a block diagram of a second illustrative system for identifying a trend and altering a process in a contact center.

FIG. 2 is a block diagram of a second illustrative system 200 for identifying a trend and altering a process 104 in a contact center 101. FIG. 2 comprises contact center 101, communication device 130, social network 120, network 140, and agent terminals 110A-110B. Contact center 101 comprises communication monitor 102, controller 103, and process(es) 104. Contact center 101 can further comprise stored prior response(s) 210, stored communication(s) 211, queue(s) 221, and Interactive Voice Response (IVR) system(s) 231.

Process 104 can further comprise queue process 220, Interactive Voice Response System (IVR) process 230, and other processes (not shown). Queue process 220 can be any process related to queue 221 such as placing a communication into queue 221 to be serviced by an agent, determining into which queue 221 to place a communication, moving a communication from one queue 221 to another queue 221, automatically responding to a communication in queue 221, placing a communication on hold in queue 221, and the like.

IVR process 230 can be any process associated with IVR system 231. For example, IVR system 231 typically contains a sequence of menus/menu items that a user has to navigate to in order to communicate with an agent at agent terminal 110. A menu would be, for instance, where IVR system 231 provides the following menu items (options) to a person who has called into contact center 101: "select 1 for issue A or select 2 for issue B." IVR system 230 may have one or more menus for a caller to navigate. The menus may be in series and/or parallel based on various implementations. Each menu may have one or more menu items (options). IVR process 230 can be how menus and/or items are added, replaced, and/or deleted in IVR system 231.

IVR system 231 can also comprise a video response system. In this case, the menus/items would be video menus/items that a user would select in order to be connected to an agent.

Stored prior response(s) 210 can be any prior response related to contact center 101. For example, stored prior response 210 can be a prior response by an agent to an issue, an automatic response sent by contact center 101, a response posted on social network 120, a recorded response by an agent, a response in IVR system 231, and the like. Stored communication(s) 211 can be any type of communication in any state that can be stored, such as a current communication that is being stored (e.g., a recorded conversation of an agent with a customer), or a prior communication. Stored communication 211 can be in any type of medium, such as a voice communication, a text communication, a voice mail, an email, an Instant Message, a video communication, a post on social network 120, a document, and the like. Stored communication 211 can be converted from one medium to a different medium (e.g., a voice communication converted to text).

Communication monitor 102 identifies a trend related to contact center 101 by examining multiple communications. For example, communication monitor 102 can monitor social network 120 for posts regarding product ABC from company X. Communication monitor 102 can also monitor incoming emails and voice calls from communication device 130. Based on examining these communications, communication monitor 102 can identify a trend. A trend can be identified based on a variety of factors, such as an increase over a previously established level (e.g., a number of posts on a subject in a time period), a decrease under a previously defined threshold, a threshold over a time period, a number of communications on a new subject, a single mention of a secret product, and the like. For instance, communication monitor 102 can identify a new type of failure of product ABC based on a specific number of posts on social network 120 discussing the failure of product ABC in an hour.

Communication monitor 102 identifies one or more communications that are related to the trend. The identified communications can be part of the monitored communications, new communications, previous communications, and the like. For instance, communication monitor 102 can monitor incoming communication(s) to contact center 101 to determine if they are related to the trend. How a communication is related to a trend can be determined in a variety of ways. For example, a communication can be identified as related based on how many times a key word is mentioned, by just mentioning a key word(s), based on a ranking of different words in the communication, by ranking the communication in relation to other communications, and the like. In response to identifying the trend, controller 103 alters process 104, which is used to route communication(s) related to the trend in contact center 101.

Altering process 104 allows communications related to the trend to be handled in contact center 101 in a more efficient manner. For instance, assume that process 104 is a queue process 220 of placing a communication in a queue 221 to be processed by an agent A at agent terminal 110A. Based on identifying that the communication is related to the trend, controller 103 alters this process and now moves the communication related to the trend into a different queue 221 that is processed by agent B (who is more familiar with the problem than agent A) at communication terminal 110B.

In a second example, assume that process 104 is IVR process 230, where there are a defined set of menu items in IVR system 231. The initial menu in IVR system 231 that a caller hears is "enter 1 for product Y and enter 2 for product Z." Agent A handles product Y and agents B and C handle product Z. For product Z, agents B and C handle the calls as they come in depending on who is available. After identifying that there is a trend, for example, that there is a specific failure F in product Z, controller 103 automatically modifies the menu of IVR system 231 so that the menu now has an additional menu item that now states "enter 1 for product Y, enter 2 for issue F in product Z, enter 3 for all other issues with product Z." A user with failure F (a communication related to the trend, which is identified by the user's selection) can now be directed to an agent who knows more about failure F in product Z; this allows the agent to resolve the customer's issue more quickly.

The determination of which agent will handle which communication related to the trend can be done automatically by examining a profile of each of the agents in contact center 101. For instance, if agent B's profile indicated that he is an expert on failure F and agent C's profile indicated that she has little experience with failure F, then controller 103 can route communications to a queue 221 for agent B when the caller selects option 2.

The above exemplary embodiment describes adding a menu to IVR system 231. However, this is just one way an IVR process 230 can be modified. For instance, a menu and/or item in IVR system 231 can be added, replaced, and/or deleted in response to identifying a trend. Another option would be to change some of the grammar in an IVR menu or the order in which the menu items are presented.

Figure 3:
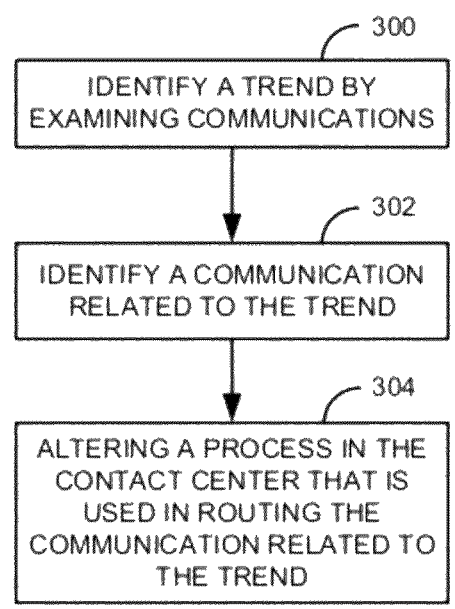
FIG. 3 is a flow diagram of a method for identifying a trend and altering a process in a contact center.
Figure 4:
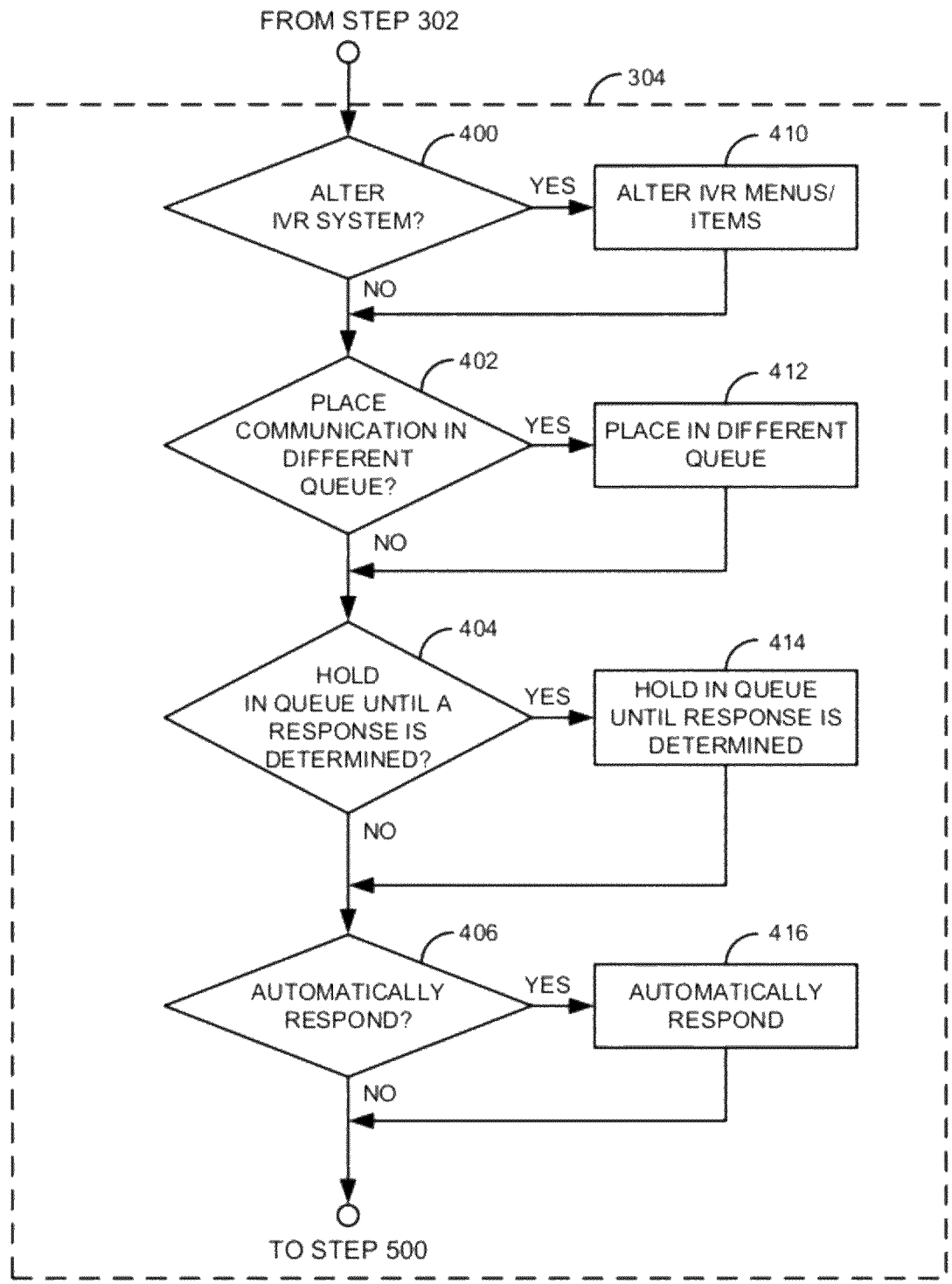
FIG. 4 is a flow diagram of a method of altering processes in a contact center.
Figure 5:
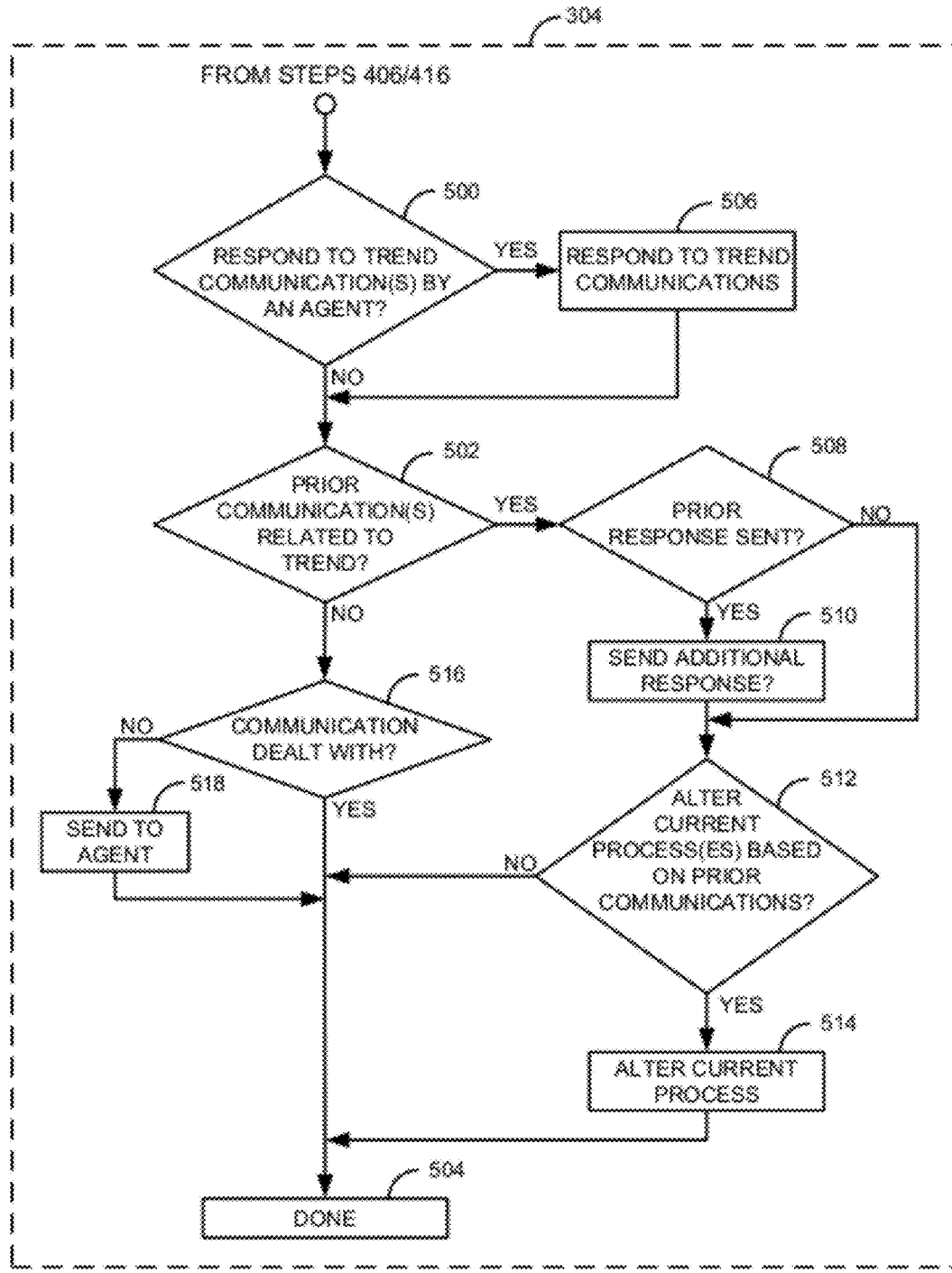
FIG. 5 is a flow diagram of a method of responding to trends in a contact center.

FIG. 3 is a flow diagram of a method for identifying a trend and altering process 104 in a contact center 101. Illustratively, contact center 101, communication device 130, communication monitor 102, controller 103, process 104, queue process 220, IVR process 230, queue 221, IVR system 231, and agent terminal 110 are stored-program-controlled entities, such as a computer or processor, which performs the method of FIGS. 3-5 and the processes described herein by executing program instructions stored in a tangible computer readable storage medium, such as a memory or disk. The methods shown in FIGS. 3-5 are shown in a specific order. However, as one of ordinary skill in the art would recognize, the order of the various steps can occur in different orders; in addition, steps can be added, deleted, and/or combined without detracting from the scope or enablement of the system and method.

Communication monitor 102 identifies in step 300 a trend related to contact center 101 by examining multiple (a plurality of) communications. Based on examining these communications, communication monitor 102 can identify a trend. Communication monitor 102 identifies in step 302 one or more communications that are related to the trend. In response to identifying the trend, controller 103 alters in step 304 process 104; process 104 is used to route communication(s) related to the trend in contact center 101.

FIG. 4 is a flow diagram of a method of altering processes 104 in a contact center 101. FIG. 4 is an exemplary embodiment of step 304 in FIG. 3. Controller 103 determines in step 400 whether to alter one or more IVR processes 230 of IVR system 231. If it is determined to alter one or more IVR processes 230 of IVR system 231 in step 400, the menus/items and/or other IVR processes 230 in IVR system 231 are altered in step 410 and the process goes to step 402. Otherwise, if it is determined not to alter IVR process 230 in IVR system 231 in step 400, the process goes to step 402.

Controller 103 determines in step 402 if it is necessary to place the communication related to the trend in a different queue 221. If it is necessary to place the communication related to the trend in a different queue 221 in step 402, the communication related to the trend is placed in a different queue 221 in step 412 and the process goes to step 404. Otherwise, if it is not necessary to place the communication related to the trend in a different queue 221 in step 402, the process goes to step 404.

Controller 103 determines in step 404 if it is necessary to hold communication(s) related to the trend in queue 221 until a response is determined. Determining how to respond can be done in a variety of ways. For example, controller 103 can alert a supervisor about the trend. Once the supervisor has determined a way for agents to respond, the supervisor can then allow communication(s) related to the trend in queue 221 to be processed by all agents or by specifically defined agents. If specific agents were designated, the process previously described in steps 402 and 412 (even though shown previously) can be used to route the communications related to the trend to the specific agents by placing the held communications in different queues 221. If controller 103 determines in step 404 that it is necessary to hold communication(s) related to the trend in queue 221, the process holds 414 the communication(s) related to the trend in queue 221 until a response is determined and the process goes to step 406. Otherwise, if controller 103 determines in step 404 that it is not necessary to hold communication(s) related to the trend in queue 221, the process goes to step 406.

Controller 103 determines in step 406 whether to automatically respond to the communication(s) related to the trend. If controller 103 determines in step 406 to automatically respond, an automatic response to the communication related to the trend is sent in step 416 and the process goes to step 500 in FIG. 5. Otherwise, if controller 103 determines in step 406 not to send an automatic response, the process goes to step 500 in FIG. 5. The automatic response can be generated/retrieved from various sources. For instance, the response that is sent in step 416 can be a stored prior response 210 that an agent created to respond to the problem. The criteria for determining whether to send the automatic response can be based on different parameters, such as a determination by controller 103, a determination by a supervisor, by the type of trend, and the like.

As an example of how steps 406 and 416 can work, consider the following. Assume that there are communication(s) related to the trend in queue 221 waiting for service by an agent. After identifying the trend, a supervisor in contact center 101 determines to use a prior response 210 by an agent to automatically respond to communications related to the trend. Controller 103 automatically responds to the communications related to the trend in queue 221 using prior communication 210. Optionally, controller 103 can then remove the communication(s) related to the trend from queue 221 so that the agent does not service the communication(s) related to the trend. The communication(s) can be optionally left in queue 221 so that the agent can review the communication(s) to make sure than no additional follow up is necessary. If follow up is necessary, the agent can also respond to the communication(s). Now, as new communications related to the trend come into contact center 101, controller 103 can automatically respond to these communications as well.

FIG. 5 is a flow diagram of a method of responding to trends in a contact center 101. FIG. 5 is a continuation of the method of FIG. 4 and step 304. Controller 103 determines in step 500 whether to allow an agent to respond to the communication related to the trend. If the agent is to respond to the communication related to the trend, the agent responds in step 506 to the communication related to the trend and the process goes to step 502. Otherwise, if the agent is not to respond to the communication related to the trend, the process goes to step 502.

Consider the following examples of how steps 500 and 506 can work. Assume that queue 221 contains five emails that controller 103 has identified as related to the trend and it has been determined that agent A is to respond to the five emails. The five emails are placed in queue 221 for agent A to respond to. The five emails can be identified to agent A as related to the trend in various ways such as a specific color, a text identifier, presenting the identified emails in a list, and the like. Agent A can then respond individually to each of the five emails. Alternatively, agent A, upon looking at the five emails, creates a single response to all five emails. Agent A then selects the five emails and sends the single response to all five emails at the same time.

In step 502, communication monitor 102 determines if there are any prior communications related to the trend. A prior communication is any communication that has not been processed prior to determining the trend. The prior communication(s) can be previous communications with contact center 101 that have been stored in stored communication(s) 211. The prior communication(s) can be communications that are mined from social network 120 and the like. If there are not any prior communication(s) related to the trend in step 502, the process goes to step 516.

Otherwise, if there are prior communication(s) related to the trend in step 502, controller 103 determines in step 508 if a prior response 210 to the prior communication(s) was sent. If a prior response was sent in step 508, controller 103 determines in step 510 if sending an additional response is necessary; if so, an additional response is sent in step 510 and the process goes to step 512. Otherwise, if a prior response was not sent in step 508, the process goes to step 512.

Consider the following example of sending an additional response. Agent A sent a prior response regarding a problem. Later, after determining the trend related to the problem, it is determined by controller 103 by examining the communications related to the trend that the prior response contained an errant statement. Controller 103 identifies the prior response that contained the errant statement (e.g., by highlighting the errant statement) to agent A. Agent A then sends an additional response that clarifies the prior response.

In step 512, controller 103 determines whether to alter current process 104 based on the prior communications determined in step 502. If controller 103 determines in step 512 to alter current processes 104, controller 103 alters the current process 104 in step 514 (e.g., in a similar manner as done in FIG. 4). The process is done 504.

In step 516, controller 103 determines if the communication has been dealt with (i.e., the communication is dealt with in steps 400, 402, 404, and/or 406). If the communication has not been dealt with in step 516, the communication is sent to an agent in step 516 for processing and the process is done 504. Otherwise, if the communication has been dealt with in step 516, the process is done 504.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
 a. identifying a trend related to a contact center by examining a plurality of communications by a server in a contact center;
 b. identifying a communication related to the trend that is sent after the trend is identified;
 c. in response to identifying the trend, identifying one or more prior communications that are related to the trend and have been received in the contact center, but have not been responded to; and
 d. in response to identifying the trend and the one or more prior communications that are related to the trend, altering a process in the contact center by a controller based on at least the one or more prior communications that are related to the trend, wherein the process is used in routing the communication related to the trend in the contact center.

2. The method of claim 1, wherein the process is placing the communication related to the trend in a first queue to be serviced by a first agent, and altering the process is placing the communication related to the trend in a second queue associated with the trend to be serviced by a second agent.

3. The method of claim 1, wherein the process is defining an Interactive Voice Response or Interactive Video Response (IVRs) system, and altering the process is at least one of the following:
 i. adding a new item to a menu of the IVR system;
 ii. adding a new menu to the IVR system;
 iii. replacing an existing menu of the IVR system;
 iv. replacing an existing item of the IVR system;
 v. deleting the existing menu of the IVR system;
 vi. deleting the existing item of the IVR system; and
 vii. reordering a menu of the IVR system.

4. The method of claim 1, wherein the process is placing the communication related to the trend in a queue to be serviced by an agent, altering the process is automatically responding to the communication related to the trend instead of allowing the communication related to the trend to be serviced by the agent, and further comprising the steps of identifying a prior response by the agent based on the trend, and wherein the identified prior response is the automatic response.

5. The method of claim 1, wherein the communication related to the trend is a plurality of communications related to the trend, the process is placing the plurality of communications related to the trend in a queue to be serviced by an agent, and altering the process is identifying the plurality of communications related to the trend to the agent and allowing the agent to respond to the plurality of communications related to the trend at the same time.

6. The method of claim 1, further comprising the steps of:
 e. responsive to identifying the trend, identifying one or more communications related to the trend that have been previously responded to; and
 f. sending an additional response to the one or more communications related to the trend.

7. The method of claim 6, wherein identifying the one or more communications related to the trend is accomplished based on a determination that the one or more communications related to the trend contains an errant statement regarding the trend.

8. The method of claim 1, wherein the process is placing the communication related to the trend in a queue to be serviced by an agent, and altering the process is holding the communication related to the trend in the queue in order to determine a response to the communication.

9. A system comprising:
 a. a communication monitor configured to identify a trend related to a contact center by examining a plurality of communications, in response to identifying the trend, identify a communication related to the trend that is sent after the trend is identified, and in response to identifying the trend, identify one or more prior communications that are related to the trend and have been received in the contact center, but have not been responded to; and
 b. in response to identifying the trend, a controller configured to alter a process in the contact center based on at least the one or more prior communications that are related to the trend, wherein the process is used in routing the communication related to the trend in the contact center.

10. The system of claim 9, wherein the process is placing the communication related to the trend in a first queue to be serviced by a first agent, and altering the process is placing the communication related to the trend in a second queue associated with the trend to be serviced by a second agent.

11. The system of claim 9, wherein the process is defining an Interactive Voice Response or Interactive Video Response (IVRs) system, and altering the process is at least one of the following: i. adding a new item to a menu of the IVR system; ii. adding a new menu to the IVR system; iii. replacing an existing menu of the IVR system; iv. replacing an existing item of the IVR system; v. deleting the existing menu of the IVR system; vi. deleting the existing item of the IVR system; and vii. reordering a menu of the IVR system.

12. The system of claim 9, wherein the process is placing the communication related to the trend in a queue to be serviced by an agent, and altering the process is automatically responding to the communication related to the trend instead of allowing the communication related to the trend to be serviced by the agent, and wherein the communication monitor is further configured to identify a prior response by the agent based on the trend, and wherein the identified prior response is the automatic response.

13. The system of claim 9, wherein the communication related to the trend is a plurality of communications related to the trend, the process is placing the plurality of communications related to the trend in a queue to be serviced by an agent, and altering the process is identifying the plurality of communications related to the trend to the agent and allowing the agent to respond to the plurality of communications related to the trend at the same time.

14. The system of claim 9, wherein the communication monitor is further configured to identify one or more communications related to the trend that have been previously responded to and in response to identifying the trend, the controller is further configured to send an additional response to the one or more prior communications related to the trend.

15. The system of claim 14, wherein identifying the one or more communications related to the trend is accomplished based on a determination that the one or more communications related to the trend contains an errant statement regarding the trend.

16. The system of claim 9, wherein the process is placing the communication related to the trend in a queue to be serviced by an agent, and altering the process is holding the communication related to the trend in the queue in order to determine a response to the communication related to the trend.

\* \* \* \* \*